July 24, 1962 W. K. HESSE 3,045,279
HIGH CROSS VELOCITY FIBERIZATION SYSTEM
Filed Nov. 4, 1957 2 Sheets-Sheet 1

INVENTOR
WALTER K. HESSE
BY
John A. McKinney
ATTORNEY

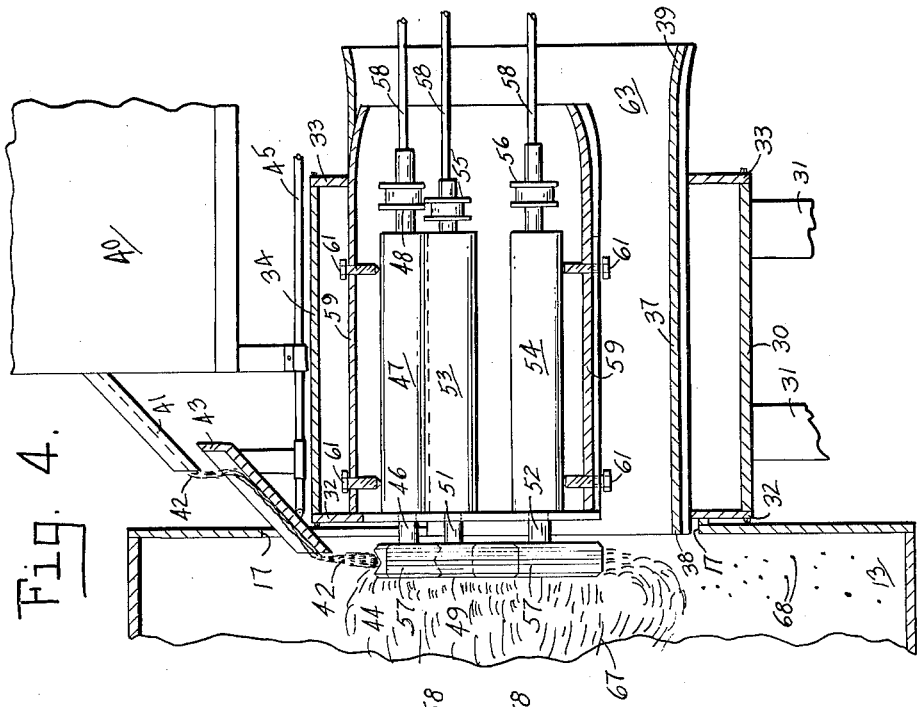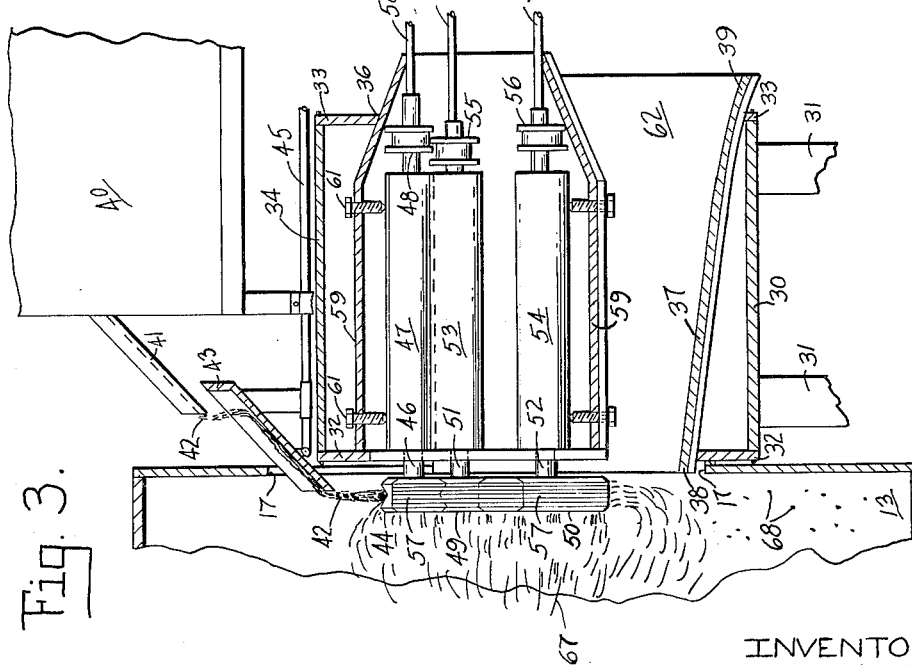

3,045,279
HIGH CROSS VELOCITY FIBERIZATION SYSTEM

Walter K. Hesse, Martinsville, N.J., assignor to Johns-Manville Corporation, New York, N.Y., a corporation of New York
Filed Nov. 4, 1957, Ser. No. 694,414
7 Claims. (Cl. 18—2.6)

This invention relates to the manufacture of mineral wool and more particularly to an improved apparatus for converting a molten mineral wool forming material into fibers. The term "mineral wool" is employed in its generic sense and is meant to include wool or fibers formed from rock, slag, fused glass, glass mixtures thereof and other heat liquefiable raw materials capable of being converted into fibers.

The molten mineral wool forming material is fiberized by the use of a plurality of cooperating rotors. The molten material is delivered to an initial or distributing rotor which serves to accelerate the movement of the material and to discharge it onto the peripheral surfaces of other rotors to which it becomes bonded in the form of incandescent rings. High speed rotation of the rotors causes fiber producing particles to be drawn from the rings of incandescent molten material by centrifugal force. Apparatus and method of this type are disclosed and claimed in the patents of E. R. Powell, Patents No. 2,428,810, No. 2,520,168 and No. 2,520,169. An undesirable aspect of this system of fiberization is the presence of a considerable quantity of unfiberized solidified particles, commonly known as shot, which reduces the quality and the commerciability of the finished product.

It is the practice to separate the fiber from the shot in this type of fiberization by air currents in the fiberization chamber. However, such air currents are full of eddys and turbulence which cause entanglement of the fibers to form clumps that trap flying shot particles. Thus, blankets of fibers emanating from the fiberizing chamber are in clumps and loaded with shot. Also, some of the fibers tend to remain in the zone of fiberization and pass again through the rotors resulting in a break-up of fiber length.

This invention utilizes a uniform velocity field in which large quantities of air moving at high uniform velocities are passed through the zone of fiberization parallel to the axes of rotation of the fiberizing rotors and immediately adjacent to the peripheries of the rotors. The term, uniform velocity field, is used in the instant specification in its generally accepted meaning as being synonymous with uniform flow or laminar flow as opposed to turbulent flow. Thus, the structure, set forth herein as acting on the fluid used to separate the fibers from the unifiberized particles so that the fluid moves in a uniform velocity field, acts on the fluid to remove substantially all eddies and turbulence therefrom. The air acts on the fibers over a measurable period of time to separate the fiber from the shot. The shot continues on its tangential path from said rotors while the fiber flows with the moving air currents to be deposited in an adjacent collecting chamber. The air flow moves the fibers away from the peripheral surfaces of the rotors so that there is no break-up of the fibers. Thus, blankets having fibers of longer length and increased toughness are produced.

It is a primary object of this invention to provide a system for removing the fiber from the shot in the immediate vicinity of its formation.

It is a further object of this invention to provide apparatus for controlling the air flow in a rotor spinning fiberization system.

It is another object of this invention to provide apparatus for producing mineral wool fibers in which the fiberization occurs in an area having a uniform velocity air flow.

The invention will be more fully understood and further objects and advantages thereof will become apparent when reference is made to the following detailed description of a preferred embodiment of the invention and the accompanying drawings in which:

FIG. 3 is a section taken on the plane passing through the line 3—3 of FIG. 2; and FIG. 4 is a sectional view similar to FIG. 3 but illustrating a different type of nozzle.

Figure 1:
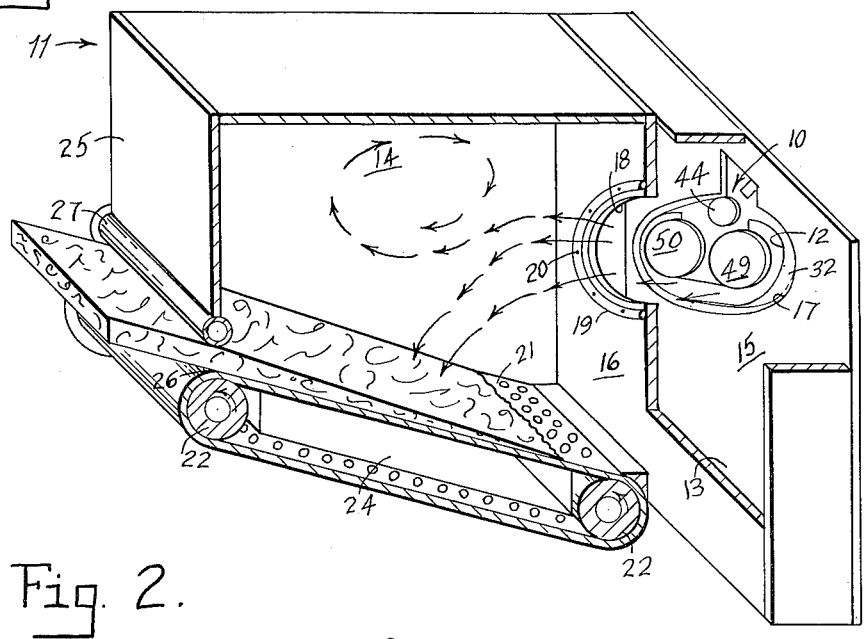
FIG. 1 is a pictorial representation of a high cross velocity fiberization system with parts in section.

Referring to the drawing, there is disclosed in FIG. 1 a fiberization system having a fiberizing unit 10 and a collection unit 11. The fiberizing unit 10 is of the type in which a plurality of rotors are positioned to have their peripheral surfaces contacted by a stream of molten raw material. Upon the high speed rotation of the rotors, fiber bearing particles are ejected by centrifugal force from an incandescent ring formed on the rotors. The fiberizing rotors are partially surrounded by an aperture 12 through which flows a fluid in a high, uniform velocity field to separate the fibers from the fiber bearing particles.

The collection unit consists of a shot trap 13 and a fiber collecting chamber 14. The shot trap 13 is a closed chamber having side walls 15 and 16. An opening 17 in the side wall 15 receives the fiberizing unit 10. The fibers formed by the unit 10 enter the collection chamber 14 through an opening 18 in the wall 16 which is common to the shot trap 13 and the fiber collection chamber 14. A pipe 19 having apertures 20 sprays a binder solution onto the fibers entering through the opening 18. The bottom wall of the collection chamber 14 comprises a perforated conveyor belt 21 suitably supported on the rollers 22 for movement in the direction indicated by the arrows. A suction box 24 is located between the upper and lower reaches of the belt 21 with its open side adjacent the lower surface of the upper reach and is connected to any suitable air exhausting means (not shown). End wall 25 of the collection chamber 14 is provided with an exit 26 through which passes the accumulated fibers on the conveyor belt 21. The exit is defined between conveyor roller 22 and pressure roller 27 and is adapted to compress the fibrous material. Air flow through the aperture 12 is induced by the suction box 24 since the only entrance for air into the collection chamber is through the opening 18 and into the shot trap is through the apertures 12 and 17.

Figure 2:
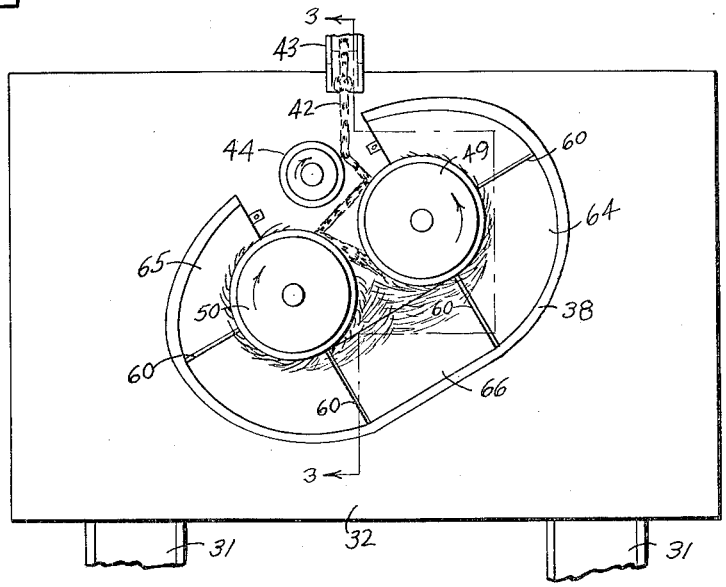
FIG. 2 is a front elevation of the fiberizing unit.

The fiberization unit 10 is disclosed specifically in FIGS. 2 and 3 wherein a base 30 is supported by the legs 31. Secured to the base 30 is a front wall 32 and a rear wall 33. A top wall 34 cooperates with a pair of side walls (not shown) to complete the housing for the unit 10. The front wall 32 is provided with the aperture 12 and the rear wall 33 is provided with an aperture 36. A housing 37 is supported by and secured to the edges of walls 32 and 33 defining the peripheries of these apertures. The forward edge of the housing 37 projects beyond the surface of the wall 32 to form a lip 38. In the rear, the housing 37 projects beyond the wall 33 to form a scoop 39.

Mounted above the fiberizing unit 10 is a cupola 40 in which the fiber forming material is melted. A discharge trough 41 directs a stream 42 of the molten material onto an oscillating trough 43 that disperses the stream 42 over the distributing rotor 44. The trough 43 is pivotally mounted for oscillation by the rod 45.

Below the trough 43 and positioned to receive the stream 42 of molten material is the distributing rotor 44. This distributor is mounted for rotation therewith on the shaft 46 which passes through the front wall 32 and is journaled in suitable bearings located in the sleeve 47. The pulley 48 on the end of the shaft 46 is connected to a drive means (not shown).

The fiberizing rotors 49 and 50 are secured on the shafts 51 and 52 which pass through the front wall 32 and are journaled for rotation in bearings located within the sleeves 53 and 54. Rotor 50 is rotated in the same direction as the distributor rotor 44 by drive means (not shown) connected to the pulley 56 while the rotor 49 is driven in the opposite direction, as indicated by the arrows, by a suitable means (not shown) connected to the pulley 55. Thus, as shown in FIG. 2, rotors 44 and 50 rotate in a clockwise direction while rotor 49 turns counter-clockwise. The peripheral surfaces of the rotors 49 and 50 have a plurality of material retaining grooves 57. A coolant is supplied to the rotors through the pipes 58. The rotor sleeves 47, 53 and 54 are enclosed within a housing 59 which is attached to the front wall 32 and is supported by the braces 60. A plurality of screws 61 retain the sleeves 47, 53 and 54 in the desired position within the housing 59.

As viewed in FIG. 3, the outer housing 37 and the rotor housing 59 cooperate to form a converging nozzle which tapers toward the aperture 12. Air enters the opening 62 and is acted upon by the nozzle until it emanates through the aperture 12 in a field of high, uniform velocity and in a direction parallel to the axes of rotation of the rotors. The aperture 12 is located in the front wall 32 so that it partially surrounds and is adjacent to the peripheral surfaces of the fiberizing rotors 49 and 50. As illustrated in FIG. 2, the aperture 12 consists of two semicircular sections 64 and 65 adjacent the outer peripheries of the rotors 49 and 50 and a somewhat rectangular section 66 joining the semi-circular sections 64 and 65. The outer periphery of the semi-circular sections has a constantly increasing radius.

The apparatus illustrated in FIG. 4 is the same as that described above except that the housings 37 and 59 are shaped and arranged to form a relatively long and straight passage nozzle. Thus, air enters through the opening 63 and is acted upon by the nozzle until it emanates from the aperture 12 in a field of high, uniform velocity and in a direction parallel to the axes of rotation of the rotors.

In the operation of the above apparatus, the trough 43 is adjusted to deliver the stream 42 of the molten raw material to the peripheral surface of the distributor rotor 44, as illustrated in FIG. 1, where it is accelerated and distributed. The molten material is of high fluidity such as is attained under conventional mineral wool fiberizing conditions. The fiberizing rotors 49 and 50 are positioned relative to the distributor 44 so that the molten material discharged tangentially by the distributor will fall over a wide area on the peripheral surfaces of these rotors. The molten material striking the rotor 49 is partially bonded to the grooved peripheral surface thereof to form an incandescent ring of molten material. The unbonded material is discharged to the rotor 50 and bonded to the grooved peripheral surface thereof to form an incandescent ring of molten material. The high speed rotation of the rotors 49 and 50 causes fiber bearing particles to be thrown off by centrifugal force from the incandescent rings of molten material. These particles move substantially in a tangential path and normally would continue to move in such a path.

After the fiber bearing particles have been ejected from the incandescent rings, it is desirable to separate the fibers from the shot. Since the drag coefficients of the fibers are much greater than those for the shot, the fibers will accompany a high velocity stream after a short period of time. During the same period, the shot will be only very slightly affected. As the fiber bearing particles leave the rotors 49 and 50, they enter the air, moving in a field of uniform velocity, which passes through the aperture 12 in a direction parallel to the axes of rotation of the rotors 49 and 50. Air currents are induced in the nozzles to flow out of the aperture 12 by the action of the suction box 24. The fibers 67 are acted upon by the high, uniform velocity air, which is moving from 1,000–5,000 feet per minute, and after a measurable time are separated from the shot 68. The fibers then accompany the air stream while the shot continues on its tangential path to be collected in the shot trap 13. Since the air issuing through the aperture 12 from the nozzles is moving in a uniform field, the fibers will be moved in one general direction so that there is little or no tendency for the fibers to form into clumps and thereby trap shot particles. Furthermore, the fibers will be removed from the zone of fiberization so that they will not be broken-up by the action of the rotors.

As illustrated in FIG. 1 the fibers, after being separated from the shot, enter the collection chamber 14 through the opening 18. A suitable binder is sprayed onto the fibers through the apertures 20 and they are then collected on the conveyor 21 to form a mat of fibrous material.

The peripheral speed of the rotors, the fluidity of the melt and the velocity of the air may be varied to meet the conditions for the material being fiberized and the quality and quantity desired. By way of example only, it may be stated that in employing a conventional mineral wool melt, successful operation was obtained by driving rotor 44 at 2840 r.p.m., rotor 49 at 3530 r.p.m. and rotor 50 at 4500 r.p.m. The relative velocity of the air, moving through the fiber bearing particles from the aperture 12 was 3000 r.p.m. The fibers shown in FIGS. 2–4 are for illustration purposes only since the individual fibers are preferably below three microns in diameter and their structure cannot be accurately determined while they are forming.

Having thus described the invention in rather full detail, it will be understood that these details need not be strictly adhered to and that various changes and modifications may suggest themselves to one skilled in the art, all falling within the scope of the invention as defined by the subjoined claims.

What I claim is:

1. In apparatus for converting molten raw material into fibers comprising means for distributing a stream of molten raw material to the peripheral surface of a fiberizing rotor to form an incandescent ring thereon and means for rotating said fiberizing rotor about an axis to eject fiber bearing particles from said incandescent ring so as to produce in a zone of fiberization a plurality of fibers and unfiberized particles, the improvement comprising:

(a) means defining a passageway comprising a plurality of cooperating stationary walls,
   (b) said passageway extending longitudinally in a direction generally parallel to the axis of rotation of said rotor,
   (c) said walls having surfaces which, in said longitudinal direction, are continuous and smooth,
   (d) said passageway terminating in an exist portion adjacent to but spaced exteriorly from the peripheral surface of said rotor,
   (e) means for moving fluid through said passageway at a velocity between about 1000 and 5000 feet per minute,
   (f) said means defining said passageway acting on said fluid as it passes therethrough to remove substantially all eddies and turbulence therefrom,
   (g) said fluid moving out of said exit and through said zone of fiberization to separate said fibers from said unfiberized particles.

2. In apparatus for converting molten raw material into fibers comprising means for distributing a stream of molten raw material to the peripheral surface of a fiberizing rotor to form an incandescent ring thereon and means for rotating said fiberizing rotor about an axis to eject fiber bearing particles from said incandescent ring so as to produce in a zone of fiberization a plurality of fibers and unfiberized particles, the improvement comprising:
(a) means defining a passageway comprising opposed, cooperating stationary walls,
(b) said passageway extending longitudinally in a direction generally parallel to the axis of rotation of said rotor,
(c) said walls having surfaces which, in said longitudinal direction, are continuous and smooth,
(d) said passageway terminating in an exist portion adjacent to but spaced exteriorly from the peripheral surface of said rotor,
(e) means for moving fluid through said passageway at a velocity between about 1000 and 5000 feet per minute,
(f) said means defining said passageway acting on said fluid as it passes therethrough to remove substantially all eddies and turbulence therefrom,
(g) said fluid moving out of said exit and through said zone of fiberization in a direction substantially parallel to said axis of rotation to separate said fibers from said unfiberized particles.

3. In apparatus for converting molten raw material into fibers comprising means for distributing a stream of molten raw material to the peripheral surfaces of a plurality of fiberizing rotors to form incandescent rings thereon and means for rotating each of said fiberizing rotors about an exis to eject fiber bearing particles from said incandescent rings so as to produce in a zone of fiberization a plurality of fibers and unfiberized particles, the improvement comprising:
(a) means defining at least one passageway extending longitudinally in a direction generally parallel to the axes of rotation of said rotors,
(b) said passageway being defined by spaced apart, cooperating stationary walls,
(c) said walls having surfaces which, in said longitudinal direction, are continuous and smooth,
(d) said passageway terminating in an exist portion adjacent to but spaced exteriorly from the peripheral surface of at least one of said fiberizing rotors,
(e) means for moving fluid through said passageway at a velocity between about 1000 and 5000 feet per minute,
(f) said means defining said passageway acting on said fluid as it passes therethrough to remove substantially all eddies and turbulence therefrom, and
(g) said fluid moving out of said exit and through said zone of fiberization to separate said fibers from said unfiberized particles.

4. Apparatus as defined in claim 3 wherein:
(a) said cooperating stationary walls are parallel to each other.

5. Apparatus as defined in claim 3 wherein:
(a) said cooperating stationary walls converge toward each other in a direction from an entrance portion thereof towards said exit portion.

6. In apparatus for converting molten raw material into fibers comprising means for distributing a stream of molten raw material to the peripheral surfaces of a plurality of fiberizing rotors to form incandescent rings thereon and means for rotating each of said fiberizing rotors about an axis to eject fiber bearing particles from said incandescent rings so as to produce in a zone of fiberization a plurality of fibers and unfiberized particles, the improvement comprising:
(a) means defining a passageway extending longitudinally in a direction generally parallel to the axes of rotation of said rotors,
(b) said passageway being defined by spaced apart, cooperating stationary walls,
(c) said walls having surfaces which, in said longitudinal direction, are continuous and smooth,
(d) said passageway terminating in an exit portion adjacent to but spaced exteriorly from the major fiber producing areas of the peripheral surfaces of said fiberizing rotors,
(e) means for moving fluid through said passageway at a velocity between about 1000 and 5000 feet per minute,
(f) said means defining said passageway acting on said fluid as it passes therethrough to remove substantially all eddies and turbulence therefrom, and
(g) said fluid moving out of said exit and through said zone of fiberization in a direction substantially parallel to said axes of rotation of said rotors to separate said fibers from said unfiberized particles.

7. Apparatus as defined in claim 5 wherein said passageway and said exit are continuous openings in transverse cross-section comprising:
(a) two oppositely located substantially semi-cylindrical portions having outer peripheries having a constantly increasing radius, and
(b) a substantially rectangular portion meeting each of said two semi-cylindrical portions where said semi-cylindrical portions have their greatest radial extent.

References Cited in the file of this patent

UNITED STATES PATENTS

| | | |
|---|---|---|
| 2,153,739 | Buss | Apr. 11, 1939 |
| 2,255,227 | Parsons | Sept. 9, 1941 |
| 2,317,895 | Drill | Apr. 27, 1943 |
| 2,318,244 | McClure | May 4, 1943 |
| 2,336,743 | Manning | Dec. 14, 1943 |
| 2,399,383 | Powell | Apr. 30, 1946 |
| 2,403,740 | Muench | July 9, 1946 |
| 2,561,843 | Coleman | July 24, 1951 |
| 2,609,566 | Slayter et al. | Sept. 9, 1952 |
| 2,624,912 | Heymes et al. | Jan. 13, 1953 |
| 2,646,593 | Downey | July 28, 1953 |
| 2,678,466 | Tillotson et al. | May 13, 1954 |
| 2,784,451 | Bowen | Mar. 12, 1957 |
| 2,869,175 | Ebbinghouse | Jan. 20, 1959 |
| 2,882,552 | Downey | Apr. 21, 1959 |